United States Patent [19]

Folch

[11] Patent Number: 4,553,644
[45] Date of Patent: Nov. 19, 1985

[54] HYDRO-PNEUMATIC BRAKING DEVICE

[75] Inventor: Carlos M. Folch, Barcelona, Spain

[73] Assignee: Bendiberica S.A., Barcelona, Spain

[21] Appl. No.: 597,147

[22] Filed: Apr. 5, 1984

[30] Foreign Application Priority Data

Apr. 8, 1983 [ES] Spain ................................ 521783

[51] Int. Cl.[4] ........................................... F16D 65/20
[52] U.S. Cl. ..................................... 188/72.4; 60/593
[58] Field of Search ................. 188/72.1, 72.4, 355, 188/358; 60/593; 92/36

[56] References Cited

U.S. PATENT DOCUMENTS

| | | | |
|---|---|---|---|
| 1,744,241 | 1/1930 | Pierle | 188/72.4 X |
| 1,909,744 | 5/1933 | Berg | 188/72.4 X |
| 2,163,034 | 6/1939 | Gosling et al. | 188/72.4 |
| 2,385,625 | 9/1945 | Hopmans | 188/196 A X |
| 3,005,444 | 10/1961 | Steibel | 60/593 X |
| 3,886,745 | 6/1975 | Kaida et al. | 60/593 X |
| 4,201,057 | 5/1980 | Martin | 60/593 |

Primary Examiner—Duane A. Reger
Attorney, Agent, or Firm—Ken C. Decker; Larry J. Palguta

[57] ABSTRACT

The device comprises a hydraulic operating actuator (5), associated with a friction element (4) and capable of being operated by a liquid under pressure to bring the friction element into frictional contact with the component to be braked (2); and a pneumatic actuator means (10), incorporating a hydraulic chamber (20), joined to the hydraulic actuator (5), and a pneumatic chamber (14) capable of being joined to a source of gas under pressure, the two chambers being separated by a movable wall structure forming a piston, the hydraulic chamber (20) being at least partially defined by a flexible elastic envelope (21) arranged in the immediate vicinity of the hydraulic operating actuator.

8 Claims, 5 Drawing Figures

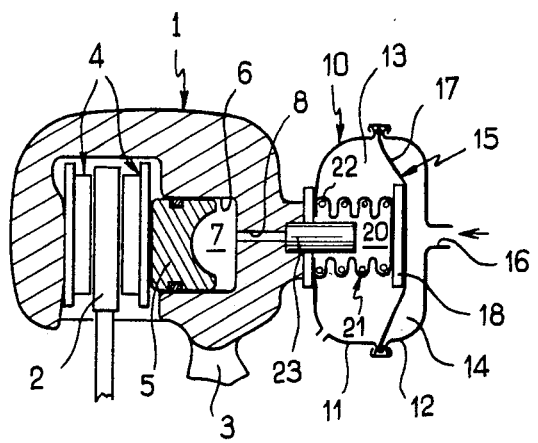
FIG_1
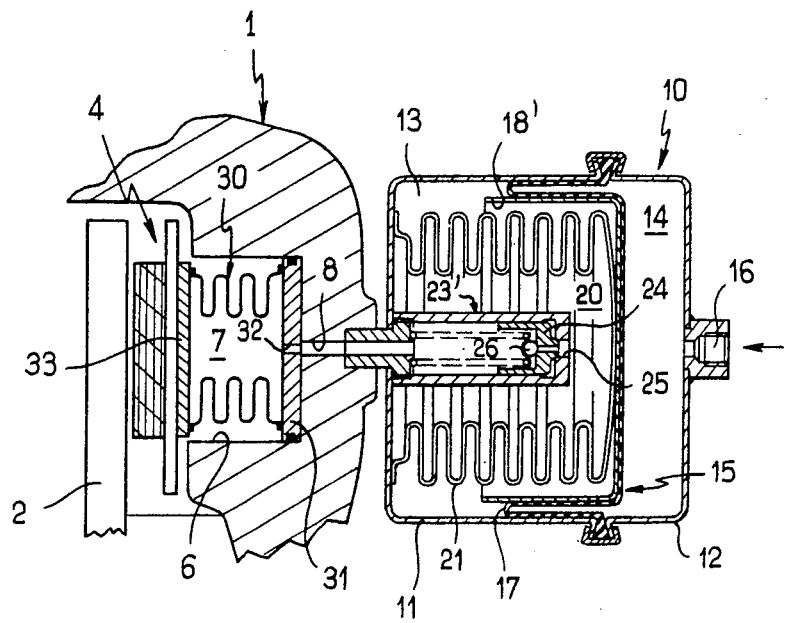
FIG_2

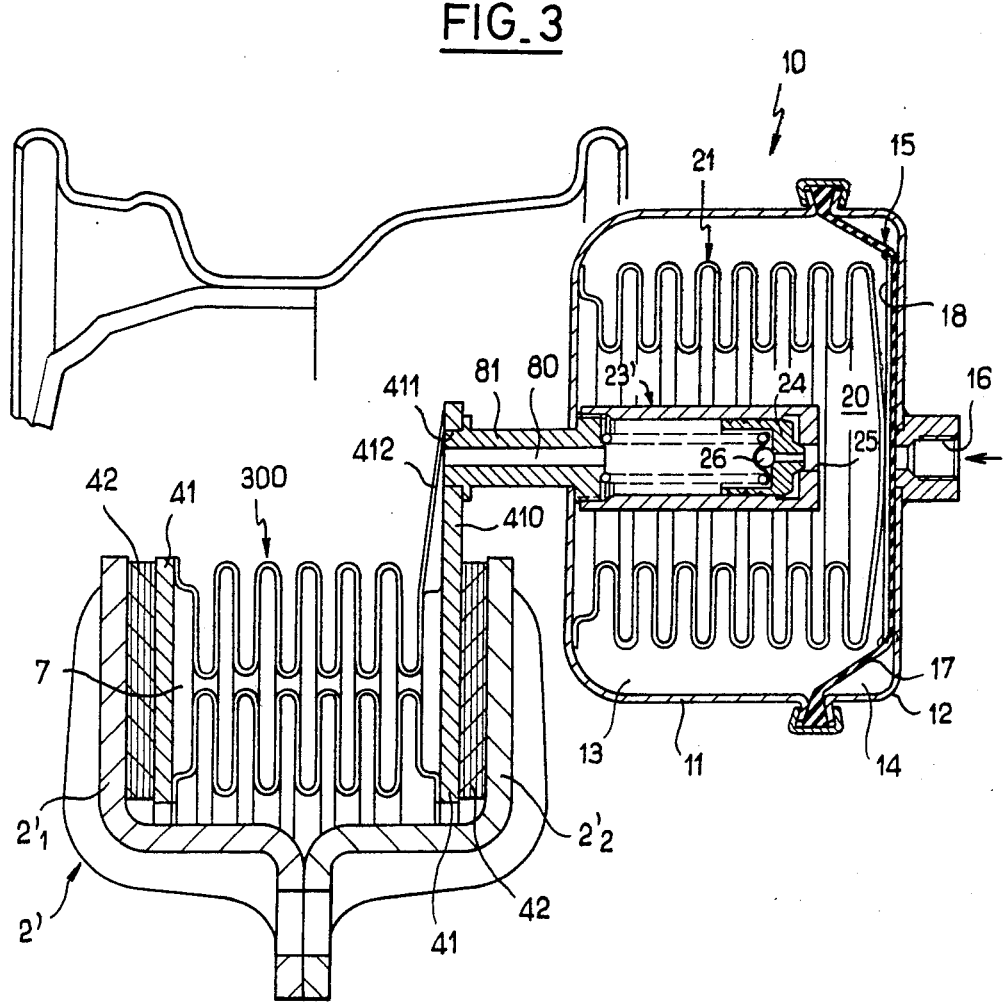
FIG_3

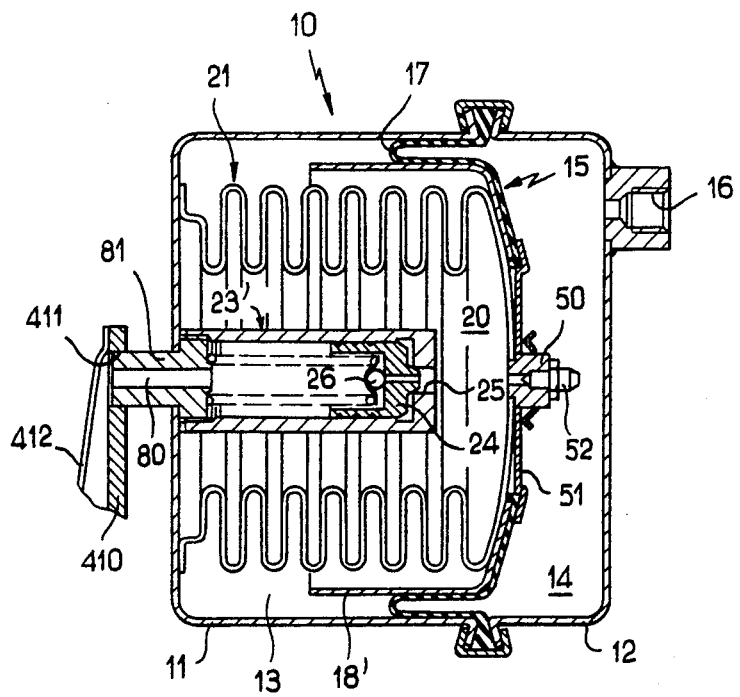
FIG_4
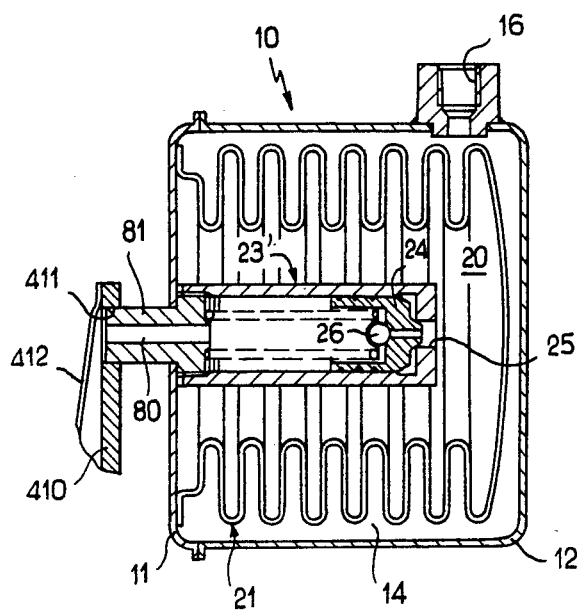
FIG_5

HYDRO-PNEUMATIC BRAKING DEVICE

The present invention concerns braking devices, particularly for vehicles, and more specifically the hydro-pneumatic braking devices of the type incorporating: at least one friction element situated in the region of a movable component to be braked; a hydraulic operating device joined to the friction element and capable of being operated by a liquid under pressure so as to displace the friction element and to bring it into frictional contact with the component to be braked; a pneumatic actuator means incorporating a hydraulic chamber, joined to the hydraulic operating device, and a pneumatic chamber, capable of being joined to a source of gas under pressure, the two chambers being separated by a movable structure forming a piston, in an arrangement such that the admission of gas under pressure into the pneumatic chamber causes a rise in pressure of the liquid contained in the hydraulic chamber for the operation of the hydraulic operating device.

Braking devices for vehicles, more specifically for motor vehicles, widely use circuits which are essentially hydraulic for operating brake actuators, also hydraulic, generally of the type with a sliding piston, situated in the wheel brakes, whether they be of disc or the drum type.

A number of vehicles, particularly utility vehicles, either roadgoing or moving on rails, utilize compressed air as a source of pressure. Thus, either purely pneumatic cylinders, such as cylinders with springs operating the brakes, particularly drum brakes, by a mechanical linkage with a cam or a wedge, or portions of hydraulic circuit supplying hydraulic brake actuators similar to those mentioned above, are provided between the pneumatic circuit and the brakes. The interface between the pneumatic circuit and the hydraulic circuit is then made with a pneumatic cylinder operating a piston of a master cylinder, provided with its reservoir of brake liquid, as shown in the document No. US-A-2,953,412, the braking control modulated by a servo-valve, taking place either upstream, as also described in this document, or downstream, as described in the document No. FR-A-2,410,584.

This type of pneumatic circuit/hydraulic circuit interface raises problems in the region of the sliding seals of the master cylinder piston, which provoke risks of leaks, and requires the presence of replenishment reservoirs for the master cylinders, increasing particularly the costs of production and of installation.

The aim of the present invention is to propose a braking device of the type defined above, eliminating the disadvantages of known devices, of reliable and effective operation, permitting a certain diversity of uses and great flexibility of adaptation.

To achieve this according to a characteristic of the invention, the hydraulic chamber of the pneumatic actuator means is at least partially defined by a flexible elastic envelope arranged in the immediate vicinity of the hydraulic operating device.

According to another characteristic of the invention, the hydraulic chamber is defined by a compressible elastic bellows, preferably a bellows made of metal.

The use of chambers with expansible walls, and particularly of bellows made of metal, in devices for hydraulic brake operation, is already known, particularly in the documents Nos. US-A-1,642,784 (drum brakes), US-A-2,174,635 or US-A-3,851,567 (disc brakes), but in the field of purely hydraulic braking systems. The document No. US-A-1,642,784 proposes, in this field, a closed system using furthermore a bellows transmitter, the latter, however, being operated manually, against a return spring, by the driver and being situated remote from the operating devices in being separated from the latter by tubing of great length, which actually prevents, due to the compressibility of air, the use of operating fluids other than liquids, contrary to the generalization considered in the introduction to this document.

Contrary to this state of the art, the present invention proposes a combined hydraulic brake actuator/hydraulic-pneumatic interface system of simple construction and reliability in use, employing a limited volume of hydraulic fluid, having a rapid response time, employing a reduced number of components and capable of being adapted to any type of vehicle brakes and particularly those of heavy or light utility vehicles.

With this aim, according to another more specific characteristic of the invention, the hydraulic operating device also incorporates at least one chamber defined by an expansible elastic envelope, advantageously a bellows made of metal joined to the hydraulic chamber upstream of the pneumatic actuator means.

Other characteristics and advantages of the present invention will emerge from the following description of embodiments, given by way of illustration but not limiting in any way, with reference to the accompanying drawings, in which:

FIG. 1 shows a first embodiment of a hydropneumatic braking device according to the invention applied to a disc brake with partial lining;

FIG. 2 shows, on a larger scale, another embodiment of a hydro-pneumatic braking device according to the invention, also for a disc brake with partial lining;

FIG. 3 shows another embodiment of the device according to the invention applied to an annular disc-brake;

FIG. 4 shows a variant of the pneumatic actuator showing an embodiment of a system for bleeding and filling the hydraulic circuit; and FIG. 5 shows a simplified embodiment of the pneumatic actuator.

In the description which follows and in the drawings, identical or similar components carry the same reference numbers, with prime suffixes where appropriate.

FIG. 1 shows a disc brake with partial lining of the type incorporating a caliper 1 straddling the disc to be braked 2 and able to slide relative to a fixed brake support 3. In a conventional manner, on each side of the disc 2 are positioned friction components or brake pads 4 operated, in the example shown, by a brake actuator piston 5 sliding in a bore 6 of a hydraulic operating chamber 7 formed in the caliper 1. In accordance with the invention, a pneumatic actuator means 10 is mounted on the caliper 1, incorporating an envelope consisting of the assembly of two shells 11 and 12 defining an internal cavity divided into two chambers 13 and 14 separated by a movable structure forming a piston 15. The shell 14, opposite the caliper 1, incorporates a connector 16 for connection to a source of gas under pressure, which may be modulated (not shown), of a motor vehicle. In the chamber 13 adjacent to the caliper 1, a hydraulic chamber 20 is provided, defined at least partially by a flexible envelope 21 and communicating with the hydraulic chamber 7 of the caliper 1 through a passage 8 formed in the latter. In the embodiments shown in FIG. 1, the flexible envelope 21 consists of a tubular bellows, made of elastomeric material, closed at one frontal end and firmly fixed, at its open end, to the face of the shell 11 mounted on the caliper 1, the envelope 21 being made elastic by a spring 22 situated in the convolutions of the bellows. The movable structure forming a piston consists of an elastic diaphragm 17, trapped at its periphery between the co-operating joining ends of the shells 11 and 12, and of a central rigid wall 18 bearing against the closed frontal end of the bellows 21.

In such an arrangement, the hydraulic chambers 7 and 20 and their intercommunicating passage 8 are filled with a hydraulic operating liquid thus occupying a limited volume. In the rest position shown in FIG. 1, in which no gas under pressure is admitted into the pneumatic inlet chamber 14 of the actuator 10, this pneumatic chamber 14 occupies a minimum volume, the bellows 21 being in a relatively relaxed configuration, the pressure of the operating liquid in the chambers 7 and 20 being reduced. When gas under pressure is admitted into the pneumatic chamber 14, the chamber 13 being at atmospheric pressure, for example, the piston structure 15 is displaced to the left in FIG. 1, in the direction tending to compress the bellows 21, thus creating a corresponding high pressure of the liquid in the chambers 20 and 7 with the transfer of a limited quantity of the latter from the chamber 20 towards the operating chamber 7 so as to operate the piston 5 and to brake the disc 2. When the admission of gas under pressure into the pneumatic chamber 14 ceases, the bellows 21 relaxes so as to resume the configuration shown in FIG. 1. In order to prevent a possible suction effect in the hydraulic operating chamber 7 and to permit automatic taking up of the wear of the friction elements 4, a non-return valve device 23 is advantageously provided in the passage 8, between the chambers 7 and 20.

The embodiment shown in FIG. 2 is similar in general outline to that shown in FIG. 1, and differs from it in the following points. The hydraulic brake actuator, housed in the caliper 1, incorporates in this case a hydraulic chamber 7 defined by an elastic bellows made of metal 30, housed in the bore 6 of the caliper 1, the frontal ends of the bellows 30 being firmly fixed, firstly to a bearing plate 31 mounted at the bottom of the bore 6 and provided with a central orifice 32 communicating with the passage 8 in the caliper 1, and secondly to an operating plate 33 bearing against the support plate of the adjacent friction element 4, possibly firmly fixed to the latter. In a similar way, the hydraulic chamber 20 of the pneumatic actuator means 10 consists, in this case, of an elastic bellows made of metal 21, made of steel or of stainless steel, for example. In this embodiment, the movable structure forming a piston 15 incorporates a rolling membrane 17, also fixed at its periphery between the shells 11 and 12, and a rigid tubular piston wall 18' the bottom of which bears against the bellows 21 and whose peripheral hoop portion partially surrounds the bellows, forming a bearing surface for the rolling membrane 17. The elasticity for returning the bellows 21 (and the diaphragm piston means 15) is provided, in this case, by the elasticity of the metal itself of the bellows 21 and 30. The operation is identical to that described previously relating to the embodiment shown in FIG. 1, excepting only to correct, in operation, the excessive tendency of the operating bellows 30 housed in the caliper 1 to return towards its rest position, and thus to provide an automatic taking up of play, the non-return valve device 23' is of the type described in the patent application filed this day by the applicant company (Ser. No. 521,784), whose contents is assumed attached herewith for reference, and incorporating essentially, in a cylindrical casing housed in the bellows made of metal 21, a piston 24, pushed by a spring in the direction tending to obstruct an inlet orifice 25 communicating with the hydraulic chamber 20 of the pneumatic actuator means 10, and provided with an axial passage passing therethrough, selectively obstructed by a ball 26 pushed by the return spring of the piston so as to tend to obstruct this through passage.

FIG. 3 shows an arrangement derived from that shown in FIG. 2 and applied to an annular brake of the opening type. The disc structure 2' has, in this case, an end in the shape of a fork forming two annular surfaces facing each other, $2'_1$ and $2'_2$, between which an annular hydraulic operating device is situated, consisting of an annular elastic bellows made of metal 300, defining the hydraulic operating chamber 7, also annular, whose ends are firmly fixed, respectively, to the annular support plates 41 for the annular friction linings 42, pushed against the surfaces facing each other of the disc structure 2' when the pressure of the hydraulic operating liquid 7 rises under the effect of the admission of a gas under pressure into the pneumatic inlet chamber 14 of the pneumatic actuator means 10, otherwise identical to that described relating to the embodiment shown in FIG. 2, excepting only that its diaphragm piston means 15 is similar to that described relating to the embodiment shown in FIG. 1. In the embodiment shown, the pneumatic actuator means 10 is mounted on a radial outwards extension 410 of the support plate 41 for the inner friction component of the wheel by means of a mounting connector 81 received in a corresponding orifice 411 in the radial extension 410 and provided with a central passage 80 establishing permanent communication between the inner chamber of the non-return valve device 23', and thus, selectively, with the hydraulic chamber 20 of the pneumatic actuator means 10, and an inlet passage to the hydraulic chamber 7 consisting of an extension 412 of the inner end of the bellows 300 arranged to cover the orifice 411 in the inner support plate 41. The support plates 41 are advantageously firmly fixed by welding to the frontal ends of the bellows 300 and are provided with heavy duty friction linings 42, as also described in the aforementioned Patent Application filed this day in the name of the applicant company.

FIG. 4 shows a pneumatic actuator 10 of the type shown in FIG. 2, associated, in accordance with the embodiment shown in FIG. 3, with an annular brake and provided with a connector 50 fixed so as to be sealed to the frontal end wall of the bellows made of metal 21 and mounted on an annular plate 51 of the piston structure 15, the rolling membrane 17 and the rigid tubular piston wall 18' being, in this case, annular and firmly fixed to the periphery of the plate 51. The connector 50, serving for filling and/or bleeding of the hydraulic circuit consisting of the chambers 7 and 20, is hermetically closed by a screw 52. In this embodiment (applicable to those shown in FIGS. 1 to 3), the filling and/or bleeding are carried out before the outer shell 12 is placed in position on the carrying shell 11. A similar system for filling and bleeding may be provided in the mounting connector 81, between the front shell 11 and the radial extension 410 of the support plate for the annular lining 41.

The embodiment with a diaphragm shown in FIG. 3 is suitable when the usable surface areas and the operating pressures allow a short travel of the pneumatic actuator, the embodiment with a rolling membrane shown in FIG. 2 being suitable, on the other hand, for conditions which require a long travel of the pneumatic actuator. If the installed position of the pneumatic actuator 10 does not cause any particular dimensional problems, the pneumatic actuator may then be arranged as shown in FIG. 5, without a diaphragm piston means, the interface for separation and for operation between the control gas and the brake liquid being provided only by the elastic bellows made of metal 21, having a limited piston surface area corresponding to the annulus between the inner folds of the convolutions and the periphery of the casing of the non-return valve device 23'. The frontal wall of the bellows 21 can also be provided with a bleed system such as that described relating to FIG. 4.

Although the present invention has been described relating to particular embodiments, it is not limited by them but on the contrary is capable of modifications and variants which will be apparent to a person versed in the art.

I claim:

1. A hydro-pneumatic braking device, comprising at least one friction member mounted adjacent a rotatable component to be braked, a hydraulic operating device mounted adjacent said friction member and operable by a liquid under pressure to urge said friction member into braking engagement with said rotatable component, and pneumatic actuator means for supplying liquid under pressure to said hydraulic operating means, said pneumatic actuator means including a casing mounted adjacent said hydraulic operating device, an elastic bellows mounted within said casing and defining a hydraulic chamber within said bellows, said hydraulic chamber being in fluid communication with the hydraulic operating device, said bellows cooperating with said casing to define another chamber therebetween, a movable wall structure mounted in said casing and extending transversely across said casing and cooperating with the casing to divide a pneumatic section out of said another chamber, means communicating said pneumatic section with a source of gas under pressure, said bellows having a transverse wall in contact engagement with said movable wall to permit movement of said movable wall to contract said bellows when gas under pressure is communicated into said pneumatic section.

2. The braking device as claimed in claim 1, wherein said bellows is made of metal.

3. The braking device as claimed in claim 1, wherein said movable wall includes a rolling membrane sealingly fixed at its periphery to said casing and a rigid wall bearing centrally against said transverse wall of the bellows.

4. The braking device as claimed in claim 1, further incorporating between the hydraulic operating device and the hydraulic chamber a non-return valve device integrated within said hydraulic chamber.

5. Device according to claim 4, characterized in that the hydraulic operating device incorporates at least one chamber (7) defined by an expansible elastic envelope (30; 300) and joined to the hydraulic chamber (20) of the pneumatic actuator means (10).

6. Device according to claim 5, characterized in that the expansible envelope consists of a bellows (30; 300).

7. Device according to claim 6, characterized in that the expansible envelope consists of a bellows made of metal (30; 300).

8. Device according to claim 7, characterized in that the bellows made of metal (30; 300) incorporates a flat end wall (33; 41) bearing against the adjacent friction member (4; 42).

* * * * *